United States Patent [19]
Matsumura et al.

[11] Patent Number: 5,993,984
[45] Date of Patent: Nov. 30, 1999

[54] FUEL CELL POWER GENERATING SYSTEM AND OPERATING METHOD THEREOF

[75] Inventors: Mitsuie Matsumura; Toshio Shinoki, both of Tokyo, Japan

[73] Assignee: Mitsubishi Denki Kabushiki Kaisha, Tokyo, Japan

[21] Appl. No.: 08/905,996

[22] Filed: Aug. 4, 1997

[30]     Foreign Application Priority Data

Sep. 25, 1996  [JP]  Japan .................................... 8-252746

[51] Int. Cl.$^6$ .................................................. H01M 8/18
[52] U.S. Cl. .............................. 429/17; 429/19; 429/13; 429/20
[58] Field of Search ................................ 429/17, 19, 13, 429/20, 24, 26

[56]             References Cited

U.S. PATENT DOCUMENTS

| | | |
|---|---|---|
| 4,647,516 | 3/1987 | Matsumura et al. . |
| 5,071,719 | 12/1991 | Rostrup-Nielsen et al. ............... 429/19 |
| 5,187,024 | 2/1993 | Matsumura . |
| 5,518,827 | 5/1996 | Matsumura et al. ...................... 429/19 |
| 5,518,828 | 5/1996 | Senetar . |

FOREIGN PATENT DOCUMENTS

| | | |
|---|---|---|
| 0 476 610 A2 | 3/1992 | European Pat. Off. . |
| 0 575 883 A1 | 12/1993 | European Pat. Off. . |

*Primary Examiner*—Maria Nuzzolillo
*Assistant Examiner*—Angela J. Martin
*Attorney, Agent, or Firm*—Sughrue, Mion, Zinn, Macpeak & Seas, PLLC

[57]             ABSTRACT

The invention has an object to provide a fuel cell power generating system with a simple system configuration, excellent in reliability and cooling ability, and permitting high power density operation. At least two internal reforming type fuel cell apparatuses are connected in series in the flow direction of a fuel gas via a methanator to ensure a flow rate of the fuel gas supplied to each fuel cell apparatus, sufficient to ensure cooling of the cells, thus eliminating the necessity of a high-temperature circulating blower or a high-temperature piping for a fuel gas, which are both expensive. Furthermore, it is possible to use the fuel gas repeatedly as a cooling gas under the effect of the methanator. It is also possible to largely improve the cooling performance of cells through internal reforming cooling, without the use of an expensive fuel gas circulating blower.

14 Claims, 5 Drawing Sheets

FUEL CELL POWER GENERATING SYSTEM AND OPERATING METHOD THEREOF

BACKGROUND OF THE INVENTION

1. Field of the Invention

The present invention relates to a power generating system using a fuel cell apparatus and an operating method thereof. More particularly, the present invention relates to an art which improves the cooling method of a fuel cell apparatus, thereby simplifying a power generating system, improving reliability, and permitting operation with a high power density.

2. Description of the Related Art

FIG. 5 is a system configuration diagram illustrating an outline, in a fuel cell power generating system disclosed in Japanese Unexamined Patent Publication No. H04-79,166, of a fuel cell apparatus and a peripheral apparatus of temperature control of this fuel cell apparatus. In FIG. 5, (1) is a fuel cell apparatus, and (2) is a fuel cell section of a laminated structure representing a main portion of the fuel cell apparatus (1), which comprises a fuel cell unit (3) having a fuel gas electrode and an oxidizing gas electrode (not shown), a fuel gas channel (4) for supplying a fuel gas (A) to the fuel gas electrode, and an oxidizing gas channel (5) for supplying an oxidizing gas (B) to the oxidizing gas electrode, as main components. Also in FIG. 5, (6) is a reforming reaction section which is thermally combined with the fuel cell section (2) by arranging the reforming reaction section adjacent the fuel cell section (2). In an example, the fuel cell apparatus (1) has a structure in which flat sheet-shaped fuel cell sections (2) and flat sheet-shaped reforming reaction sections (6) are alternately laminated.

In FIG. 5, (7) is an air feeder which recovers power from waste gas (C) discharged from the fuel cell power generating system and supplies air (D) from outside by increasing pressure, and (8) is a circulating blower which circulates the reformed gas containing a hydrocarbon for temperature control of the fuel cell apparatus (1). In the same drawing, (9) is a methanator which methanates hydrogen, carbon monoxide and carbon dioxide contained in the reformed gas circulated by means of the circulating blower (8).

Now, operation of this conventional case will be described below. During constant-load operation of the fuel cell apparatus (1), a waste heat generated, corresponding for example to 30 to 70% of output power, must be efficiently eliminated. In the conventional case shown in FIG. 5, the fuel cell section (2) is cooled by introducing the reforming gas containing a hydrocarbon or an alcohol and steam into the reforming reaction section (6) holding a reforming catalyst in the inside thereof, and causing a reforming reaction which is an endothermic reaction in this reforming reaction section (6). In this example, the fuel cell apparatus (1) has a laminated structure in which, for example, a plurality of fuel cell sections (2) each comprising several laminated flat sheet-shaped fuel cells and flat sheet-shaped reforming reaction sections (6) are alternately laminated. When the fuel cell is a molten carbonate type one, reforming reactions expressed by the following formulae (1) to (3) proceed to the right at a temperature within a general operating temperature of from 600 to 700° C. in the reforming reaction sections (6):

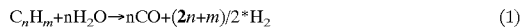
$$C_nH_m + nH_2O \rightarrow nCO + (2n+m)/2 \cdot H_2 \tag{1}$$

$$\text{Alcohol} + H_2O \rightarrow CO, CO_2, H_2 \tag{2}$$

$$CH_4 + H_2O \rightarrow CO + 3H_2 \tag{3}$$

The reformed gas containing hydrogen, carbon monoxide and carbon dioxide produced by the reforming reactions expressed by the foregoing formulae (1) to (3) as main constituents is supplied to a methanator (9) by the action of a circulating blower (8). The methanator (9) is usually a heat-exchanger type reactor having therein a methanation catalyst, and comprises a reaction-side space holding the methanation catalyst in a state capable of coming into contact with the reformed gas (F), and a cooling-side space having the heat-exchanging relationship with the reaction-side space and through which a coolant (G) flows. In this conventional case, the methanator (9) is operated at an operating temperature (for example, about 250 to 500° C.) lower than the operating temperature (600 to 700° C.) of the reforming reaction section (6).

The reforming reaction expressed by the formula (3) is a reversible reaction. The methane producing reaction (methanation reaction) toward the left in the formula (3) proceeds more according as the operating temperature becomes lower, and at the same time, tends to discharge a reaction heat. More specifically, the reaction heat produced along with the cell reaction in the fuel cell section (2) is discharged to outside the fuel cell apparatus (1) through progress of the reforming reaction (an endothermic reaction) of hydrocarbon (methane) in the reaction gas by the action of the reforming reaction section (6). The waste heat of the fuel cell discharged outside is discharged into the coolant (G) flowing on the cooling side of the methanator (9) along with the progress of the methanation reaction (an exothermic reaction) of the reaction gas (F) in the methanator (9).

In the foregoing conventional case, as described above, the reformed gas (F) is caused to circulate between the reforming reaction section (6) and the methanator (9). An endothermic reaction proceeds in the reforming reaction section (6), and the fuel cell section (2) is cooled by causing an exothermic reaction in the methanator (9).

When cooling a molten carbonate type fuel cell stack operating at a high temperature of the order of from 600 to 700° C., it is difficult to apply liquid cooling or ebullition cooling which is an efficient cooling method, and therefore, it has been the conventional common practice to apply gas cooling using a reaction gas such as an oxidizing gas. Gas cooling has however posed problems in terms of the efficiency of the power generating system, performance of the fuel cell apparatus and maneuverability such as a large temperature distribution (for example, about 100° C.) produced in the flow direction of the cooling gas, necessity of a large auxiliary power for circulating the cooling gas, a large amount of oxidizing gas flowing through the oxidizing gas channel adjacent to the oxidizing gas electrode, resulting in a large pressure loss, increase in the pressure difference between the fuel gas side and the oxidizing gas in the fuel cell, leading to a higher risk of cross leakage, and necessity of an oxidizing gas channel having a large sectional area. These defects have been particularly serious when operating a fell cell continuously at a higher power density, i.e., with the fuel cell in a state of a high current density (for example, current density: 200 to 300 mA/cm².

The conventional case shown in FIG. 5 was conducted to solve the problems as described above. Because of the cooling system based on reforming reaction heat in the conventional case shown in FIG. 5, the takeout amount of heat per unit quantity of gas is 100 to 150 times as large as that in a simple gas cooling, and it was possible to cool the stack with a small cooling gas flow rate. Furthermore, since cooling is based on reaction heat of reformed gas unlike in the gas cooling based on sensible heat, it was possible to accomplish cooling at a uniform temperature throughout the entire surface of the fuel cell in principle, and even in a high current-density operation, to ensure stable operation with a uniform temperature distribution free from such problems as creation of a hot spot.

However, in the conventional power generating system having the configuration as described above, it is necessary to ensure circulation of the reformed gas which is a high-temperature combustible wet gas through a circulation channel via a circulating blower (8) as a coolant for cooling the fuel cell stack. It is therefore difficult to provide a good gas sealing at the driving shaft of the circulating blower (8), resulting in technical problems in practice including the necessity of an expensive circulating blower (8). An auxiliary power is still required for circulation of the reformed gas. Furthermore, a piping for the reformed gas which serves for cooling is necessary, in addition to the piping for the fuel gas and the oxidizing gas participating in the cell reactions, as a takeout from the fuel cell. This poses another problem of an increased number of piping systems and the increased amount of radiant heat from the piping.

Apart from the necessity of an expensive high-temperature circulating equipment and a high-temperature piping for building a cooling system, an auxiliary power is required, and there is an increase in the amount of radiant heat from the piping, leading to problems in cost, power generating efficiency and reliability of the power generating system.

The present invention was developed to solve these problems as described above, and has an object to provide a low-cost fuel cell power generating system high in reliability and power generating efficiency and excellent in maneuverability, which eliminates the necessity of a fuel gas circulating blower or an excessive piping for the fuel gas for cooling.

SUMMARY OF THE INVENTION

In the fuel cell power generating system of the present invention, at least two internal reforming type fuel cell apparatus are connected in series in the flow direction of the fuel gas via a methanator.

According to the foregoing configuration, in which a plurality of internal reforming type fuel cell apparatuses are connected in series in the flow direction of the fuel gas, it is possible to supply the fuel gas which serves as a reaction gas for the fuel cell and as a cooling gas of the fuel cell in an amount sufficient to cope with the heat removal requirement of the fuel cell apparatuses. The methanator provided between the fuel cell apparatuses methanates the fuel gas after the reforming reaction, discharged from the upstream fuel cell apparatus, and regenerates the same as a fuel gas having a cooling ability containing methane. This permits repeated effective utilization of the fuel gas for reaction as well as for cooling.

In a preferred form of the invention, at least two internal reforming type fuel cell apparatus are connected in series in the flow direction of the fuel gas via a methanator; the foregoing internal reforming type fuel cell apparatus has a fuel cell section comprising a plurality of fuel cells and a reforming reaction section provided in thermal combination with the foregoing fuel cell section; and the fuel gas supplied from outside to the fuel cell apparatus is directed, after supplied to the reforming reaction section, to the fuel gas for the fuel cell section.

According to the foregoing configuration, a plurality of internal reforming type fuel cell apparatuses are connected in series in the flow direction of the fuel gas via the methanator, and the foregoing internal reforming type fuel cell apparatus has a structure in which the fuel cell section and the reforming reaction section are separately provided in the fuel cell apparatus. The configuration and the methanator therefore serve to permit repeated effective utilization of the fuel gas for reaction as well as for cooling. The reforming reaction section effectively serves to achieve a uniform operating temperature and inhibit production of a hot spot as a cooler for the fuel cell section.

In another preferred form of the invention, the methanator is separately provided on the upstream side of the fuel gas side of the fuel cell apparatus located in the most upstream in the flow direction of the fuel gas.

According to the foregoing configuration, the methanator separately provided on the upstream side of the fuel gas side of the fuel cell apparatus located in the most upstream in the flow direction of the fuel gas makes it possible as required to cause progress of methanation reaction of the fuel gas and to adjust the amount of cooling resulting from the reforming reaction in the fuel cell apparatus in the upstream. Particularly, the methanator alleviates the risk of carbon precipitation by pre-reforming of a higher hydrocarbon in the raw fuel, and reduces the risk of sulfur poisoning of the reforming catalyst of the internal reforming type fuel cell apparatus in the downstream.

In a further preferred form of the invention, there is provided as required a piping through which part of the fuel gas bypasses the fuel cell.

According to the foregoing configuration, the aforesaid bypass piping allows part of the fuel gas as required to bypass the fuel cell in a state capable of adjusting the flow rate to permit easy adjustment of the amount of heat in reforming reaction in the fuel cell apparatus.

In a further preferred form of the invention, at least two fuel cell apparatus are connected in series in the flow direction of the reformed gas via a methanator, and the reformed gas discharged from the reforming reaction section located in the most downstream in the flow direction of the reformed gas is supplied as the fuel gas for the fuel cell section.

According to the foregoing configuration, the methanator provided between a plurality of reforming reaction sections connected in series serves to permit efficient cooling by reforming reaction, and ensures repeated efficient utilization of the reformed gas as a cooling gas in a plurality of fuel cell apparatuses without using a circulating blower. Since the reformed gas in the system of the invention is configured so as to have no relationship with the cell reaction until completion of the role of the reformed gas as a cooling gas, the reformed gas in the system of the invention shows no change in the composition on the level of the number of atoms, and cooling of the fuel cell apparatus using the reformed gas is easily designed with a high reliability. Further, the reformed gas discharged from the reforming reaction section in the most downstream is directed into the fuel cell section, and the reformed gas for cooling can be effectively used as a fuel gas.

In a further preferred form of the invention, the fuel cell apparatus is configured as a lamination formed by alternately laminating flat sheet-shaped reforming reaction sections and flat sheet-shaped fuel cell sections. The plurality of reforming reaction sections are grouped in accordance with upstream/downstream in the flow direction of the reformed gas, and are arranged in the lamination so that two adjacent reforming reaction sections with a fuel cell section in between are of different groups, thereby forming two or more fuel cell apparatuses into one integral fuel cell apparatus.

According to the foregoing configuration, the integrally structured fuel cell apparatus reduces the required length of the high-temperature gas piping and thus reduces the amount of radiant heat. Furthermore, discrimination of the fuel cell apparatuses on upstream/downstream sides is eliminated, and operational control is simplified.

In a further preferred form of the invention, a methanator is separately provided in the upstream of the reforming reaction section of the fuel cell apparatus in the most upstream in the flow direction of the reformed gas.

According to the foregoing configuration, the methanator provided further in the upstream of the fuel gas side of the fuel cell apparatus located in the most upstream in the flow direction of the fuel gas makes it possible to cause as required the methanation reaction of the reformed gas to proceed, and to adjust the amount of cooling by the reforming reaction in the fuel cell apparatus in the upstream. Particularly, pre-reforming of higher hydrocarbon in the raw fuel alleviates the risk of carbon precipitation, and reduces the risk of sulfur poisoning of the reforming catalyst of the reforming reaction section in the downstream.

In a further preferred form of the invention, the methanator is a heat-exchange type reactor, and the heat resulting from the methanation reaction is effectively utilized in the fuel cell power generating system.

According to the foregoing configuration, the methanator of the heat-exchanger type improves the recovery efficiency of heat produced from methanation reaction in a space on the cooling side of the methanator, and permits effective utilization of the produced heat within the fuel cell power generating system.

In a further preferred form of the invention, there is provided as required a piping for part of the reformed gas to bypass the reforming reaction section or the reforming reaction section and the following methanation section.

According to the foregoing configuration, the aforesaid bypass piping makes it possible for part of the reformed gas as required to bypass the reforming reaction section or the reforming reaction section and the following methanator in a state capable of adjusting the flow rate so as to permit easy adjustment of the amount of heat of cooling caused by the reforming reaction in the reforming reaction section of the fuel cell apparatus.

In a further preferred form of the invention, in a fuel cell power generating system comprising at least two internal reforming type fuel cell apparatus connected in series in the flow direction of the fuel gas via a methanator, the fuel cell power generating system is operated so as to adjust the methanation reaction temperature at the exit portion of the fuel gas of the methanator, thereby adjusting the operating temperature of the fuel cell apparatus.

According to the foregoing operating method, it is possible to adjust the methane flow rate in the fuel gas at the exit of the methanator in a state capable of prediction by adjusting the methanation reaction temperature of the methanator, and it is consequently possible to adjust the flow rate of methane supplied to the fuel cell apparatuses located in the downstream of the fuel gas, and thus to adjust the amount of heat of cooling of the fuel cell apparatuses caused by the reforming reaction of methane.

In a further preferred form of the invention, in a fuel cell power generating system comprising two or more fuel cell apparatuses each having fuel cell sections and reforming reaction sections connected in series in the flow direction of the reformed gas via a methanator, the fuel cell power generating system is operated so as to adjust the operating temperature of the fuel cell apparatus by adjusting the methanation reaction temperature at the exit portion of the reformed gas of the methanator.

According to the foregoing operating method, it is possible to adjust the flow rate of methane in the reformed gas at the exit of the methanator by adjusting the methanation reaction temperature of the methanator, and as a result, to adjust the flow rate of methane supplied to the reforming reactor of the fuel cell apparatuses located in the downstream of the reformed gas, thereby permitting adjustment of the amount of heat of cooling of the fuel cell apparatus caused by methane reforming reaction.

DESCRIPTION OF THE PREFERRED EMBODIMENTS

Now, embodiments of the present invention will be described below with reference to the drawings.

Embodiment 1

Figure 1:
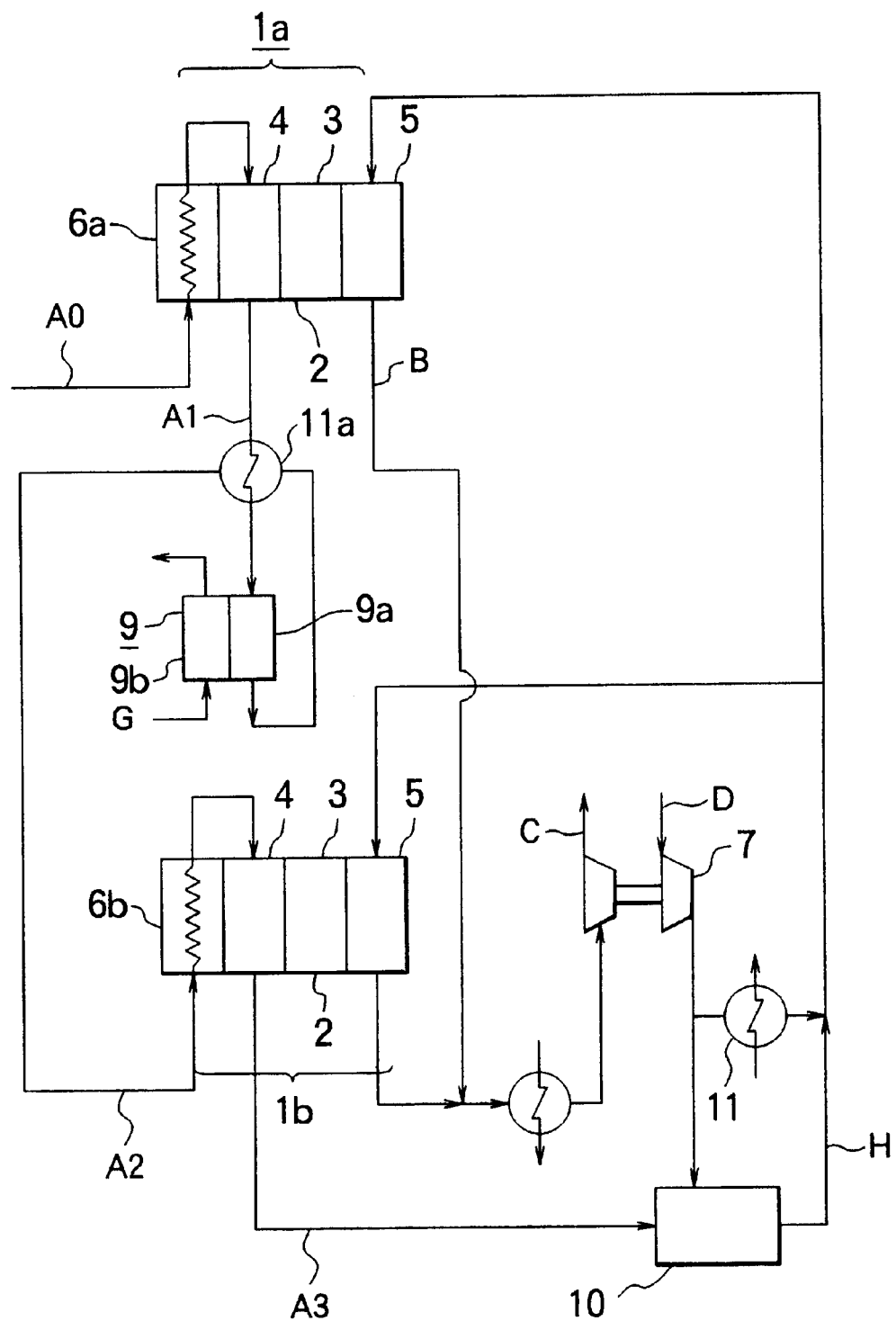
FIG. 1 is a system configuration diagram illustrating the fuel cell power generating system of an embodiment 1 of the invention.

FIG. 1 is a configuration diagram illustrating the fuel cell power generating system of an embodiment 1 of the invention. In FIG. 1, two internal reforming type fuel cell apparatuses (1a) and (1b) are connected in series in the flow direction of a fuel gas, respectively forming an upstream fuel cell apparatus and a downstream fuel cell apparatus. A methanator (9) similar to a conventional one has a reaction-side space (9a) having therein a methanation catalyst and a cooling-side space (9b) allowing flow of a coolant (G) for cooling the interior thereof. A burner (10) burns combustible components not consumed in the fuel cell sections and discharged from a fuel gas channel (4) of the downstream fuel cell apparatus (1b). A heat exchanger (11) appropriately adjusts a reaction gas in this fuel cell power generating system to a prescribed temperature. The other reference numerals, representing the same parts as in the foregoing conventional case, are not described here.

Now, operation of the embodiment 1 will be described below. In the fuel cell power generating system of the invention, the fuel gas (fuel gas formed by mixing mainly a hydrocarbon or an alcohol and steam) to be supplied to the fuel gas channel (4) of the fuel cell apparatus is first supplied to a reforming reaction section (6a) of the upstream fuel cell apparatus (1a). For simplicity, the following description will be based on a fuel gas comprising a mixed gas of methane and steam only (the main component of a natural gas most commonly used as a fuel gas is usually methane). Methane in the fuel gas reacts with steam under the effect of the reforming reaction section (6a) and is decomposed into hydrogen, carbon monoxide and carbon dioxide via stream reforming reaction. The reforming conversion of methane can well be conjectured at a sufficient accuracy by calculating an equilibrium gas composition under reaction conditions (temperature, pressure and steam/methane ratio) of the reforming reaction section (6). More accurately, for example, calculation is accomplished by introducing a correction temperature known as the approaching temperature available by converting the difference between the equilibrium gas composition and the observed gas composition in terms of temperature. The reformed reaction gas is supplied to the fuel gas channel (4) of an adjacent fuel cell stack (2), and subjected to a fuel cell reaction at a fuel gas electrode adjacent to the fuel gas channel (4). Available types of fuel cell apparatus (1) include an advanced internal reforming type fuel cell apparatus keeping a reforming catalyst in the interior of the fuel gas channel (4), and an indirect internal reforming type fuel cell power generating apparatus not having a reforming catalyst at the fuel gas channel (4). The present invention is applicable to any of these types. In the case of the advanced internal reforming type fuel cell apparatus, hydrogen in the fuel gas is consumed, and remaining methane in the fuel gas is further decomposed in the fuel gas channel (4) under the effect of steam produced from the cell reaction and the reforming catalyst.

The fuel gas consumed in the upstream fuel cell apparatus (1a) cooled as required to a prescribed temperature in a regeneration type heat exchanger (1a), and then supplied to a methanator (9). The methanator (9) is operable at a temperature of about 250 to 500° C. as in the foregoing conventional case: hydrogen and carbon monoxide or carbon dioxide in the fuel gas react in the reaction-side space (9a) to produce methane. Simultaneously, the heat produced from the methanation reaction is discharged into the coolant (G) flowing through the cooling-side space (9b). The coolant is, for example, water, and a high-temperature and high-pressure steam is produced through heat-exchange within the methanator (9). The produced steam is supplied to the upstream fuel cell apparatus (1a) by appropriately mixing with a natural gas (methane) for such uses as a raw fuel gas (A0), or effectively utilized in or outside the power generating system as a power source of a steam turbine, for example.

The fuel gas having an increased methane content under the effect of the methanator (9) is then supplied to the reforming reaction section (6b) of the downstream fuel cell apparatus (1b), and first serves as a cooling gas of the downstream fuel cell apparatus (1b). The fuel gas having a hydrogen content increased by the reforming reactions is supplied to the fuel gas channel (4) in the fuel cell section (2) of the downstream fuel cell apparatus (1b) and used as a fuel gas for fuel cell reactions.

The fuel gas after use in the fuel cell apparatuses is a mixed gas mainly comprising carbon dioxide, usually with residual combustible gas components. The combustible gas components are burned in the burner (10) with air fed from a separate air feeder (7). The flue gas (H) mainly comprising carbon dioxide after burning is supplied to an oxidizing gas channel (5) of the fuel cell apparatus (1) together with air separately fed, and subjected to cell reactions.

On the basis of the configuration and the basic operations of the power generating system described above, the following features are available in this embodiment:

1. Because the fuel gas is used for fuel cell reactions as well as for fuel cell cooling in this power generating system, it is not necessary to provide an expensive high-temperature piping for cooling, thus permitting achievement of a simple and low-cost piping, resulting in reduction of radiation loss from the high-temperature cooling piping.

Figure 5:
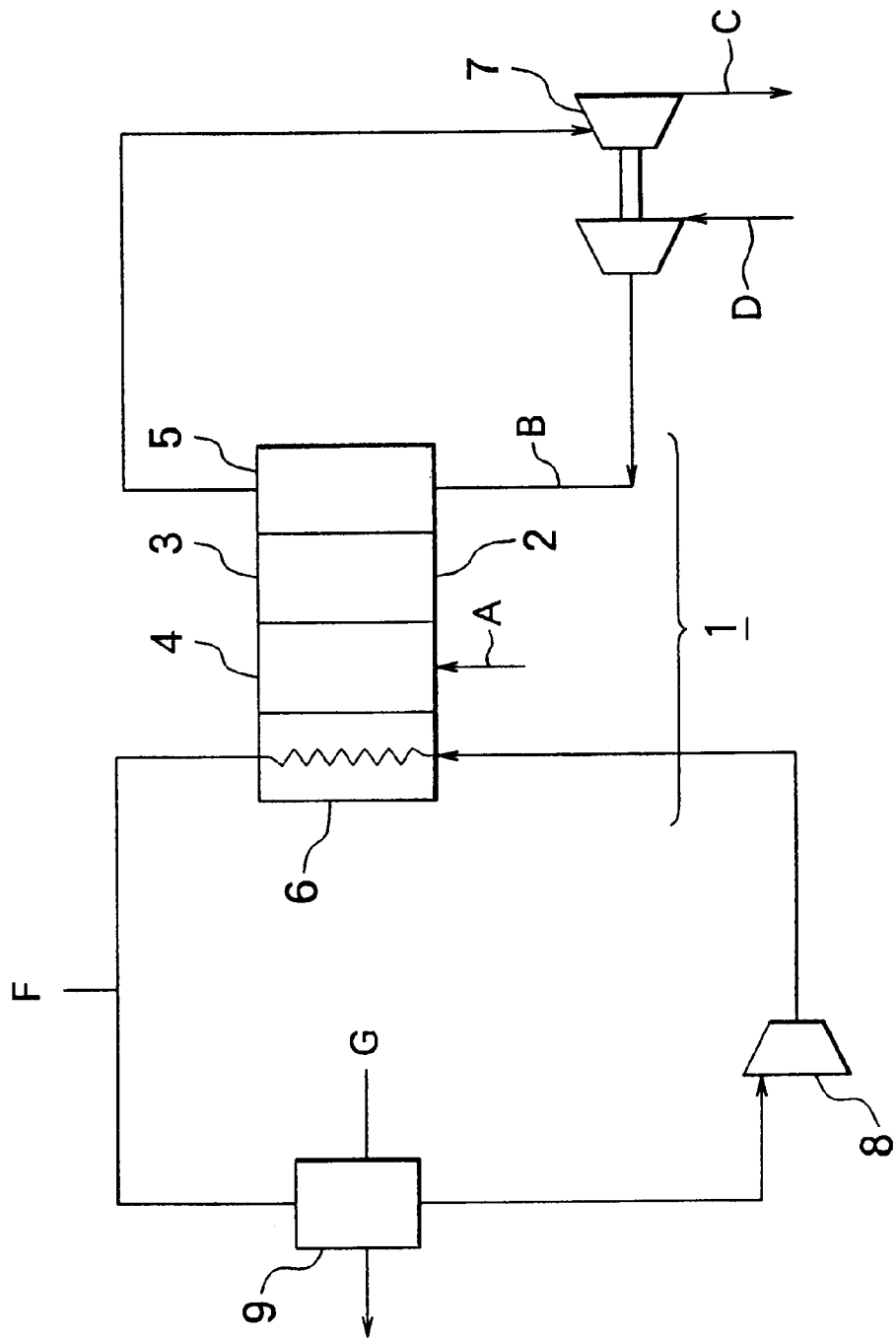
FIG. 5 is a system configuration diagram illustrating a conventional fuel cell power generating system.

2. In order that a major portion of cooling of the fuel cell is to be accomplished with the use of the absorbed heat through the reforming reactions in this power generating system, the fuel cell apparatuses are connected in series in the supply direction of the fuel gas so as to increase the amount of supplied fuel gas per fuel cell apparatus and to ensure necessary hydrocarbon (methane). This eliminates the necessity of circulating blower ((8) in FIG. 5) of a high-temperature fuel gas which has so far been necessary in the conventional case. When the power generating system is operated under a high pressure, this superiority is important in terms of safety regarding fuel gas leakage at a gas sealing section near the blower rotation shaft and the blower cost. In this system as well, some pressure-increasing means may be required for supplying the fuel gas depending on the supply conditions of the raw fuel gas (natural gas). In this case, however, a pressure-increasing means is necessary also in the conventional case shown in FIG. 5. The pressure-increasing blower in this case may be a low-cost one of the room-temperature specifications, and this blower is free from mixing of steam or the problem of condensation.

Now, operations of the upstream and the downstream fuel cell apparatuses (1a) and (1b) under typical operating conditions of the system configuration shown in FIG. 1 will be described below.

Typical chemical compositions of fuel gases (A0), (A1), (A2) and (A3) in FIG. 1 obtained by calculation are shown in Table 1. Operating conditions include an operating pressure of 5 atm, a steam/methane ratio of 3.5, an average current density of the fuel cell apparatus (first and second stages) of 240 mA/cm$^2$, and a fuel gas utilization ratio of 80%, with a typical operating temperature of the fuel cell apparatus of 650° C. and a methanation temperature of 300° C. at the fuel gas exit of the methanator.

TABLE 1

| Fuel gas compositions at various positions (mol %) | | | | |
| --- | --- | --- | --- | --- |
| Position of fuel gas | A0 | A1 | A2 | A3 |
| Methane | 22.2 | 0.7 | 7.4 | 0.0 |
| $H_2O$ | 77.8 | 47.2 | 60.3 | 50.9 |
| $H_2$ | 0.0 | 18.6 | 1.0 | 5.8 |
| CO | 0.0 | 5.6 | 0.0 | 2.4 |
| $CO_2$ | 0.0 | 27.9 | 31.3 | 40.9 |
| Reforming conversion of methane (%) (Supplied methane basis) | 0.0 | 94.3 | 46.6 | 100.0 |

The fuel gas (A2) supplied to the second-stage fuel cell apparatus (1b) connected in series is different from the fuel gas (A0) supplied to the first-stage fuel cell apparatus (1a) in the ratio of the number of atoms C/H/O by amounts corresponding to the fuel gas consumed through a fuel cell reaction (on the fuel gas side: the formula (4) below) in the fuel cell section of the first-stage fuel cell apparatus (1a). More specifically, as a result of consumption of hydrogen by the fuel cell reaction and the resultant production of steam (see the formula (4) below), the equilibrium of the reforming reaction shifts toward the methane decomposing side, and even at the exit of the methanator (9), ratio of methane reformed is 46.6% in the supplied methane basis (in the absence of a cell reaction in the upstream fuel cell apparatus (1a), there is obtained a reforming ratio of 4.0% at the exit of the methanator (9) under the same conditions, resulting substantially in the same gas compositions for (A0) and (A2)):

$$H_2 + CO_3^{2-} \rightarrow H_2O + CO_2 + 2e^- \quad (4)$$

Under the conditions considered here, consequently, methane in the fuel gas supplied to the upstream fuel cell apparatus (1a) exhibits a large flow rate and there is a large amount of removed heat caused by the internal reforming reaction. That is, in this embodiment, the amount of cooling resulting from the reforming reaction in the upstream fuel cell apparatus (1a) accounts for about 92% of the produced heat of the cell, and in the downstream fuel cell apparatus (1b), about 67%. In this embodiment 1, in the upstream fuel cell apparatus (1a), it is possible to cool the fuel cell with substantially the reforming reaction alone, and use the minimum amount of supply of oxidizing gas to the extent necessary for the cell reaction. In the downstream fuel cell apparatus (1b), on the other hand, it is necessary to cool the remaining about 33% of the generated cell heat through oxidizing gas cooling. This is sufficiently smaller than the cooling load of 40 to 50% with an oxidizing gas in the conventional system, thus permitting efficient cooling mainly based on the reforming reactions.

The embodiment 1 has been described above as to a system achieved by the application of the present invention to an advanced internal reforming type or an indirect internal reforming type fuel cell configured by inserting flat sheet-shaped cooling reformers (reforming reaction sections) into a lamination of flat sheet-shaped fuel cell units as an internal reforming type fuel cell. In the internal reforming type fuel cell provided with flat sheet-shaped reforming reaction sections, an optimum thermal balance between the distribution of exothermic heat of the fuel cell sections and the distribution of endothermic heat of the reforming reaction sections can be achieved easily through optimum-design of the reformer with respect to the progress of the reforming reaction inside. This results in improvement of cell performance of the fuel cell by increasing the average operating temperature of the fuel cell sections and achievement of a longer service life of the cell members by eliminating high-temperature portions (e.g., The 4th Power/Energy Tech. Symposium Proceedings, A29 (1994), or 1995 IEEE/ PES Winter Meeting (New York, N.Y.) No. 95 WM 084-4 EC). In this embodiment, the fuel cell sections are cooled mainly by reforming reaction cooling. A fuel cell power generating system excellent in cooling of the fuel cell and excellent from the point of view of the system design can be obtained, by applying the invention to a power generating system using internal reforming type fuel cells having reforming reaction sections independently partitioned from the fuel cell sections. In a direct internal reforming type fuel cell holding a reforming catalyst in the fuel gas channel, however, it is known that an allowable thermal balance can be achieved between the heat generation of the fuel cell reaction and the heat adsorption of the reforming reaction through, for example, optimization of the fuel gas flow configuration (for example, working out a return flow of the fuel gas). Therefore, even to a direct reforming type fuel cell holding a reforming catalyst in the fuel gas channel, the present invention is applicable.

Embodiment 2

Figure 2:
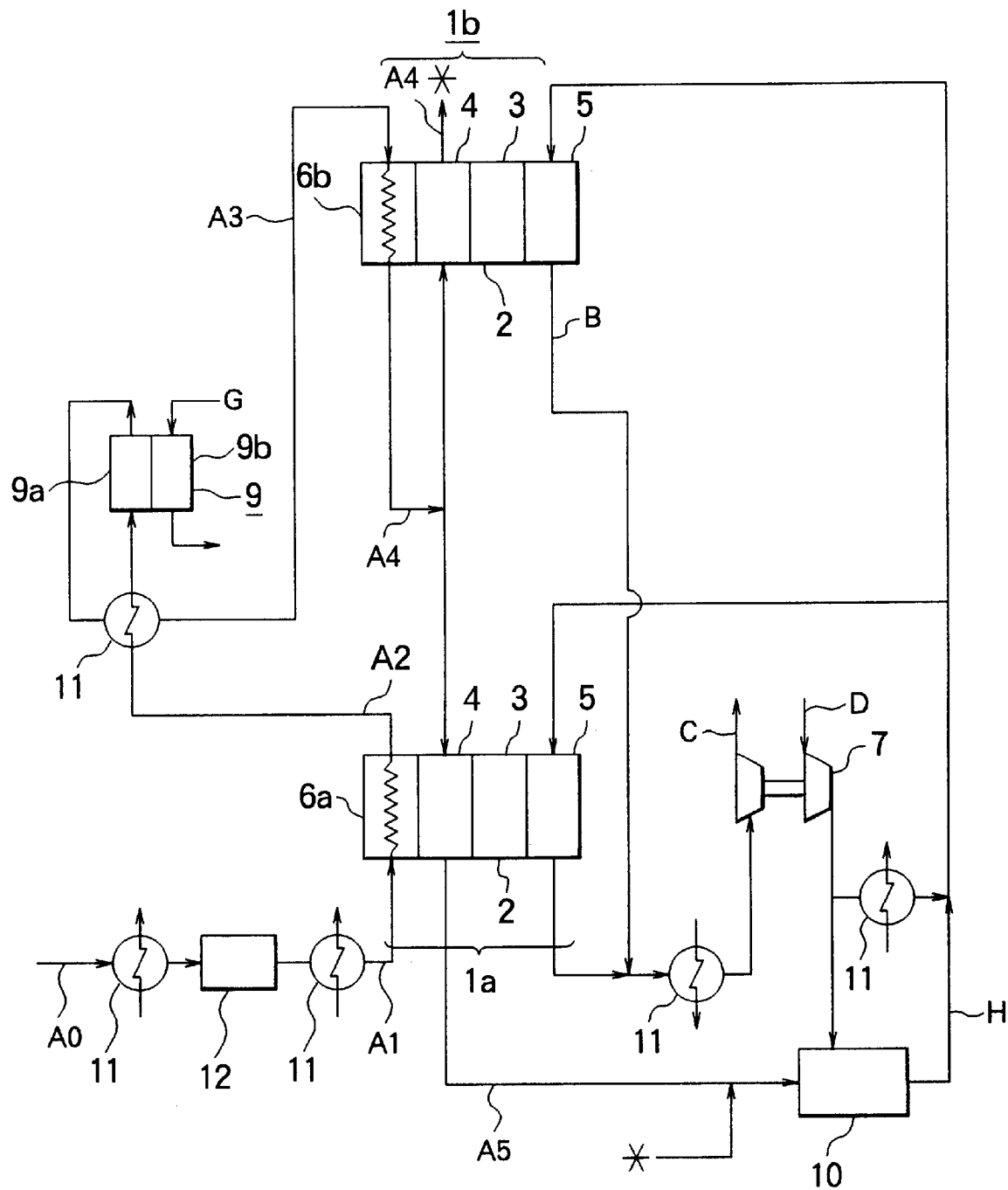
FIG. 2 is a system configuration diagram illustrating the fuel cell power generating system of an embodiment 2 of the invention.

FIG. 2 is a configuration diagram of a fuel cell power generating system of an embodiment 2 of the invention. The embodiment 2 covers a fuel cell power generating system comprising two internal reforming type fuel cell apparatuses (1a) and (1b) having reforming reaction sections (6a) and (6b) spatially partitioned from a fuel cell section (2), connected in series in the flow direction of the reformed gases (A1), (A2), (A3) and (A4) via a methanator (9). In the embodiment 2, a separate entry-side methanator (12) is provided in the upstream of the reforming reaction section (6a), to which a raw fuel gas (A0) is supplied after appropriately adjusting temperature thereof. The reformed gas discharged from the reforming reaction section (6b) of the downstream fuel cell apparatus (1b) is subsequently supplied to the fuel cell section (2) and serves as a fuel gas for fuel cell reaction. Operations of the other parts are the same as in the embodiment 1 shown in FIG. 1.

Now, operations of the upstream and the downstream fuel cell apparatus (1a) and (1b) will be described below under typical operating conditions of the system configuration shown in FIG. 2.

Typical chemical compositions of the reformed gases (A0), (A1), (A2), (A3) and (A4) and the fuel gas (A5) in FIG. 2 based on a calculation are shown in Table 2. The operating conditions include an operating pressure of 5 atm (506, 625 Pa), a steam/methane of 3.5, an average current density of the fuel cell apparatuses of 240 mA/cm², and a fuel gas utilization ratio of 80%, with a typical operating temperature of the fuel cell apparatus of 650° C. and a methanation reaction temperature at the reformed gas exit of the methanator of 300° C.

TABLE 2

| Fuel gas composition at various positions (mol %) | | | | | | |
|---|---|---|---|---|---|---|
| Position of fuel gas | A0 | A1 | A2 | A3 | A4 | A5 |
| Methane | 22.2 | 21.0 | 5.9 | 21.0 | 5.9 | 0.0 |
| H₂O | 77.8 | 74.8 | 41.4 | 74.8 | 41.4 | 50.9 |
| H₂ | 0.0 | 3.4 | 41.4 | 3.4 | 41.4 | 5.8 |
| CO | 0.0 | 0.0 | 3.8 | 0.0 | 3.8 | 2.4 |
| CO₂ | 0.0 | 0.9 | 7.5 | 0.9 | 7.5 | 40.9 |
| Reforming conversion of methane (%) (Supplied methane basis) | 0.0 | 3.9 | 65.8 | 3.9 | 65.8 | 100.0 |

In the embodiment 2 shown in FIG. 2, the reformed gas flows through the two reforming reaction sections (6a) and (6b) connected in series in the flow direction of the reformed gas via the methanator (9) without participating in the fuel cell reaction. As a result, the C/H/O atomic number ratio is always kept constant while the gas flows through the reforming reaction sections (6a) and (6b). Therefore, the amount of reforming reaction, i.e., the amount of heat of cooling caused by the reforming reactions, in the reforming reaction sections (6a) and (6b) is substantially constant, irrespective of the upstream/downstream arrangement position of the fuel cell apparatus. In this system configuration, therefore, almost the same cooling design can be applied for all the stacks, thus permitting simplification of the thermal design and the operating control method. Details are as follows.

The example of calculation shown in Table 2 is based on a fuel cell apparatus of the advanced internal reforming type holding a reforming catalyst not only in the reforming reaction section but also in the fuel gas channel of the fuel cell section. In this power generating system, both the reforming reaction sections (6a) and (6b) have respectively methanators (12) and (9) operating under almost the same operating conditions so that reformed gases of almost the same compositions are supplied to both reforming reaction sections. The individual fuel cell apparatuses (1a) and (1b) therefore give the same amount of cooling caused by reforming reactions (sum of the amounts of reforming reactions in the reforming reaction section and the fuel gas channel). In this power generating system, as described above, it is possible to operate both fuel cell apparatuses under identical cooling conditions, thus permitting achievement of simplification in maneuverability/controllability.

The thermal balance in the absence of a methanator (12) on the entry side, on the other hand, is as follows. The amount of cooling caused by the reforming reactions is about 91% of the amount of cell generated heat in the upstream fuel cell apparatus (1a), and about 87%, in the downstream fuel cell apparatus (1b). This difference between upstream and downstream is caused by the difference in the reforming ratio between the raw fuel (reformed gas (A0)) and the reformed gas (A1). When the difference in the amount of cooling is of this order, it is possible to adjust the difference in the amount of absorbed heat between the upstream and the downstream reforming reaction sections by appropriately adjusting the cooling conditions of the oxidizing gas. More specifically, a cooling of about 20% of the cell generated heat is possible also by means of the oxidizing gas minimum necessary for the cell reaction. The difference in the amount of absorbed heat between the upstream and the downstream reforming reaction sections can well be adjusted by appropriately fine-adjusting a cooling condition of oxidizing gas, such as oxidizing gas entry temperature or flow rate.

However, the following two points become additional advantages of the entry-side methanator (12). First, the methanator (12) pre-reforms higher hydrocarbons (ethane, propane, butane, etc.) contained as about 5 to 20% of a natural gas at a low temperature within a range of from about 300 to 400° C. into a mixed gas of methane, hydrogen, CO and $CO_2$. Therefore, the methanator (12) alleviates the risk of carbon precipitation resulting from pyrolysis of high-grade hydrocarbons in the subsequent high-temperature piping or the reforming section. Second, because of the condition of low-temperature operation of the methanator (12), it is possible to capture sulfur almost completely even when sulfur slips from a desulfurizer (not shown). As a result, the downstream fuel cell apparatus is protected from toxicity of sulfur. The reforming catalyst in the fuel cell apparatus is sensible to sulfur poisoning and replacement of the catalyst is practically impossible. Protection of the reforming catalyst from sulfur poisoning is therefore a very important task for a long operation of this power generating system. The methanation catalyst used in the methanator (12) is a low-cost one and the methanator (12) has a structure permitting easy replacement of the methanation catalyst. In this respect, the methanator (12) provided at the entry brings about an important advantage as a sulfur guard.

The entry-side methanator (12) may have a heat-exchanger type reactor structure as described above just as the methanator (9). In this case, however, a further simpler structure of reactor may be adopted. When the reformed gas (A0) is preheated to a temperature, for example, within a range of from about 400 to 500° C. by means of a heat exchanger (11) or the like, decomposition and methanization of high-grade hydrocarbons in the reformed gas can be accomplished with its own sensible heat, by adopting an adiabatic reactor as the methanator (12). In the reactor, it suffices to charge a commercially available methanation catalyst or a catalyst for preliminary reforming reactions at low temperatures (these catalysts may be nickel or a precious metal held on a ceramic carrier such as alumina or magnesia).

In the embodiment 2 shown in FIG. 2, as described above, the reformed gas is prevented from flowing through the fuel cell section during the reformed gas flowing through the reforming reaction section. A sufficient a amount of reforming reaction substantially equal to that at the upstream reforming reaction section (1a) is therefore available even in the downstream reforming reaction section (1b), thus making it possible to cool the fuel cell apparatuses mainly by means of the reforming reactions. As a result, almost the same cooling design is applicable irrespective of the stack arrangement, thus providing a simple system in terms of design as well as of control.

In the foregoing embodiments 1 and 2, power generating systems having a construction in which mutually independent fuel cell apparatus in lamination are connected in series in the flow direction of the fuel gas or the reformed gas via the methanator have been presented. The plurality of fuel cell apparatuses are not necessarily required to be mutually independent.

Embodiment 3

Figure 3:
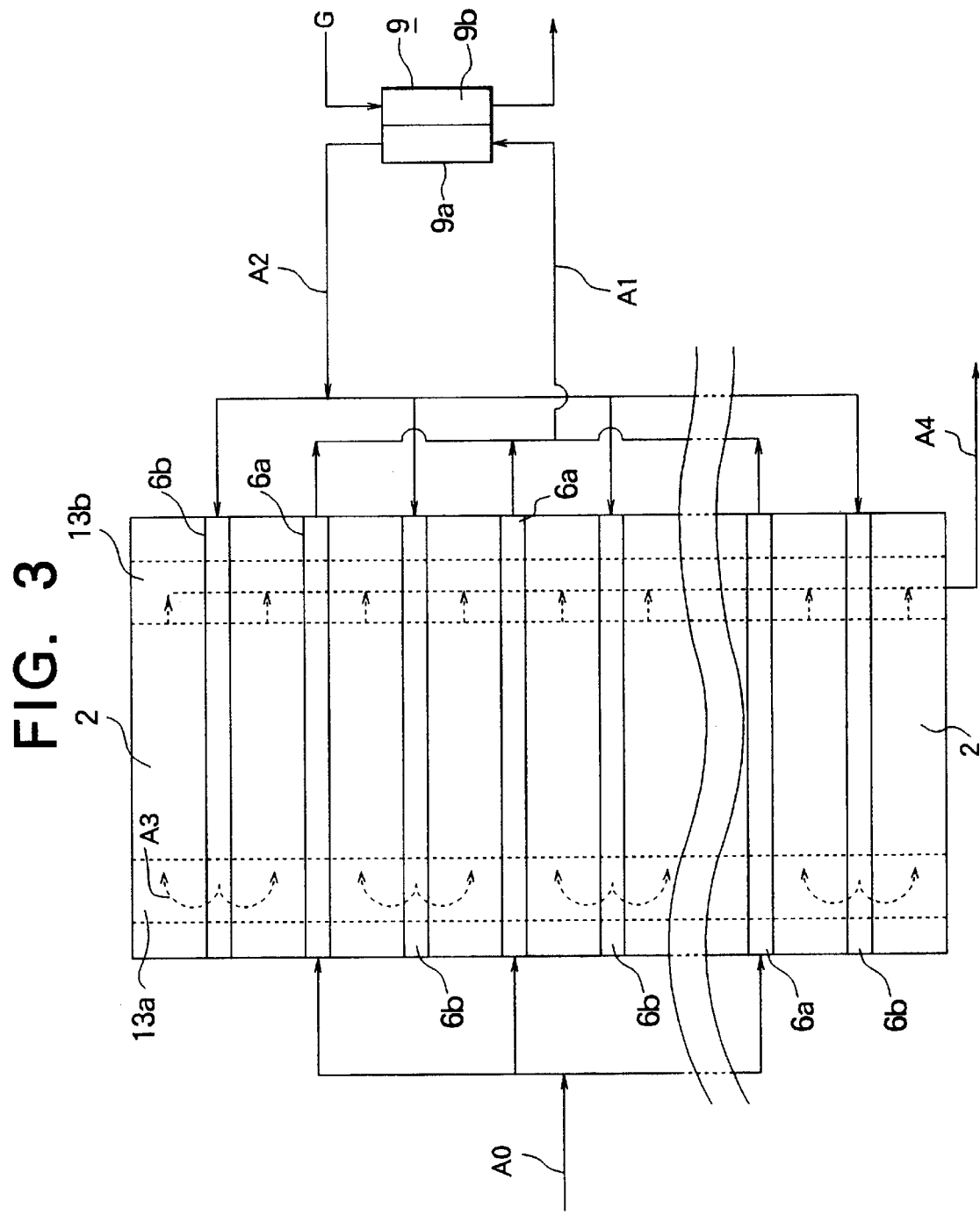
FIG. 3 illustrates a connecting configuration of reformed gas/fuel gas of the fuel cell apparatus and the peripheral equipment thereof in the fuel cell power generating system of an embodiment 3 of the invention.

FIG. 3 illustrates an embodiment 3 of the invention: FIG. 3 is a schematic view showing a gas connection configuration and the gas flow (reformed gas/fuel gas) of a fuel cell apparatus built by incorporating an upstream reforming reaction section (6a) and a downstream reforming reaction section (6b) into a fuel cell apparatus forming a single structure. In FIG. 3, (13a) and (13b) represent a fuel gas reversing gas manifold and a fuel gas exit manifold provided as throughholes in a fuel cell apparatus (1). In FIG. 3, the solid line arrow shows the flow of the reformed gas/fuel gas, and the dotted line arrow indicates the flow of the fuel gas in the both gas manifolds. A raw fuel (reformed gas (A0)) supplied from outside is directed to the upstream reforming reaction section (6a) provided in the fuel cell apparatus (1), and while conducting reforming reactions in this reforming reaction section (6a), the gas performs cooling of the adjacent fuel cell section (2) by means of a heat absorption occurring therefrom. A reformed gas (A1) after reforming is directed to a reaction-side space (9a) of the methanator (9), where it is converted into a reformed gas (A2) mainly comprising methane, and directed again to the downstream reforming reaction section (6b) of the fuel cell apparatus (1). In the downstream reforming reaction section (6b) also, the gas is subjected to reforming reactions, and cools the adjacent fuel cell section (2) through heat absorption occurring therefrom. In the fuel cell apparatus (1) of this embodiment 3, the upstream reforming reaction section (6a) and the downstream reforming reaction section (6b) are alternately arranged via the fuel cell section (2). A supply/discharge structure of oxidizing gas, a structure for stack compression, an end structure and other general structures necessary for building a fuel cell apparatus are omitted in FIG. 3. Heat generated from a cell reaction in the fuel cell section (2) is cooled mainly by the adjacent reforming reaction sections (6a) and (6b). The downstream reforming reaction section (6b) has an exit opening communicating with the fuel gas reversing gas manifold (13a). The reformed gas (A3) is distributed from the downstream reforming reaction section (6b) through the fuel gas reversing gas manifold (13a) to a fuel gas channel (4) of the fuel cell unit (3) forming the fuel cell section (2). The fuel cell section (2) is formed by laminating a plurality (four to ten, for example) of flat sheet-shaped fuel cell units (3) together with the adjacent fuel gas channel (4) and the oxidizing gas channel (5). The fuel gas (A3) directed to the fuel gas channel (4) performs a fuel cell reaction at a fuel gas electrode of the adjacent fuel cell unit (3), thereby producing power. A reforming catalyst is held as required in the fuel gas channel (4). Methane remaining unreacted at the reforming reaction sections (6a) and (6b) is further decomposed and converted into hydrogen (in the case of an advanced internal reforming type fuel cell apparatus).

The fuel gas (A4) after the cell reaction is gathered in the fuel gas exit gas manifold (13b) and directed to outside the fuel cell apparatus. Subsequent flows of the gas and the oxidizing gases from the fuel cell apparatus (1) are the same as in the embodiments 1 and 2 shown in FIGS. 1 and 2.

The equipment configuration of the embodiment 3 shown in FIG. 3 is basically the same as in that shown in FIG. 2. Additional advantages are however obtained by configuring the upstream and the downstream fuel cell apparatuses into an integral structure. In the embodiment 3 shown in FIG. 3, a gas piping for the reformed gas (A3) is not necessary, thus permitting simplification of the system and reduction of the amount of radiant heat. In the embodiment 3, the upstream and the downstream reforming reaction sections are incorporated into an integral fuel cell apparatus, making it unnecessary to make a delicate adjustment of operational conditions for cooling of the individual fuel cell apparatus based on the difference in the amount of reforming reactions between the upstream and the downstream fuel cell apparatuses, thereby permitting further simplification in the aspect of operational control. Particularly, this embodiment 3 does not require discrimination of the fuel cell apparatuses into upstream and downstream ones, and is therefore suitable for application to a fuel cell power generating system of a relatively small capacity.

As another embodiment in which the upstream and the downstream fuel cell apparatuses are arranged into an integral structure, for example, the upstream and the downstream fuel cell apparatuses may be laminated one on top of the other to form an integral laminated structure, and the fuel gas reversing gas manifold and the fuel gas exit gas manifold may be arranged so as to pass through the upper and lower portions of the fuel cell apparatuses to form an integral structure.

Embodiment 4

Now, the operating method of the power generating system of the invention will be described in terms of heat control of the fuel cell apparatus. In the invention, as described above, heat generated in the fuel cell apparatus is cooled by heat absorption accompanying the reforming reactions in the reforming reaction section. When the amount of generated heat changes for reason of partial load operation of the fuel cell apparatus or change of the cell properties as a function of time, it is necessary to adjust the amount of heat absorption in the reforming reaction section, i.e., the amount of reforming reactions, in response to the amount of generated heat.

Figure 4:
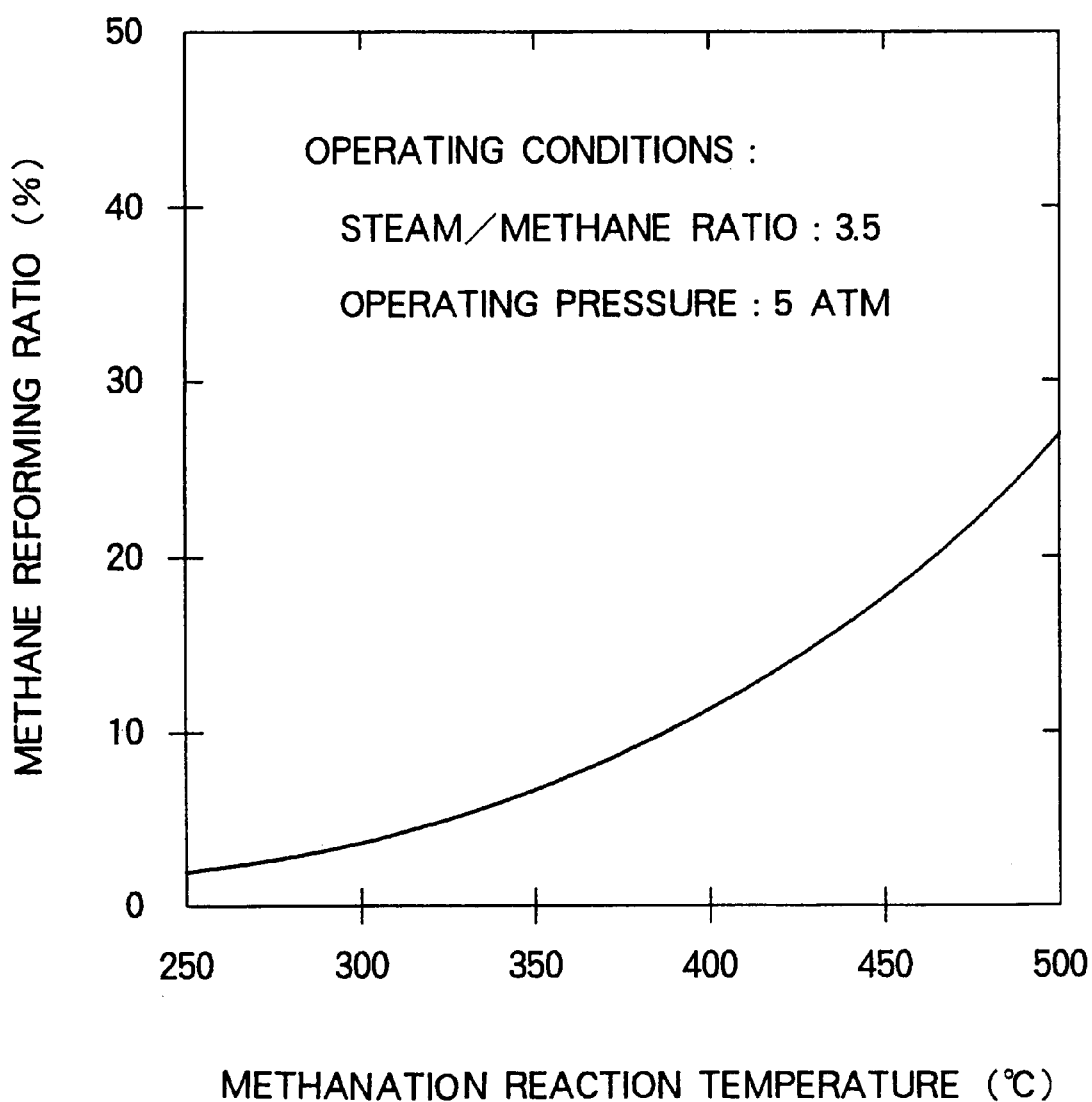
FIG. 4 is a graph illustrating the relationship between the methanation reaction temperature and the reforming conversion of methane, being important base data in adjusting the operating method of the fuel cell power generating system of the invention.

The reformed gas composition at the exit portion of the methanator is usually near the equilibrium gas composition dependent on the operating conditions. Furthermore, as shown in FIG. 4, the methane reforming ratio in the equilibrium gas composition largely depends upon the methanation reaction temperature at the exit portion of the reformed gas. It is therefore possible to control the methanation reaction temperature at the reformed gas exit portion and to appropriately adjust the reforming ratio of the reformed gas supplied to the reforming reaction section by adjusting the operating conditions (for example, the amount of supplied coolant, and temperature) of the cooling-side space of the methanator. The reforming ratio at the exit of the reforming reaction section is calculated on the basis of the operating conditions in the plant design: the difference in the reforming ratio between entry and exit of the reforming reaction section is known on the basis of information of the methanation reaction temperature, thereby allowing setting and adjustment of the amount of heat of cooling in the reforming reaction section.

Embodiment 5

As further another operating method, it is possible to adjust the amount of cooling in the reforming reaction section by separately providing a bypass line for part of the reformed gas to bypass the reforming reaction section, and adjusting the flow rate of the reformed gas passing through this bypass line (or supplied to the reforming reaction section).

In the foregoing embodiments 1 and 2, examples in which two fuel cell apparatuses are connected in series in the flow direction of the fuel gas or the reformed gas have been presented. The invention is not however limited to these embodiments 1 and 2, but three or more fuel cell apparatuses may be connected in series. In this case, there is an increasing number of fuel cell apparatuses connected in series, and there is an increased flow rate of the fuel gas capable of being supplied per fuel cell apparatus. In this case, it is not necessary to supply methane in an excessive amount to the fuel cell apparatuses in consideration of the heat balance at each of the fuel cell apparatuses, but it is necessary on the contrary to inhibit the methane flow rate so as to satisfy the heat balance. More specifically, it is possible to set the methanation reaction temperature in the individual methanators at a higher value than in the case of the two-stage connection in series, leading to a higher temperature level of waste heat discharged from the methanator. As a result, the power generating efficiency of the fuel cell power generating system can be improved. However, because the power generating system becomes more complicated in equipment configuration and in control, an appropriate selection is required.

In the embodiments 1 and 2 shown in FIGS. 1 and 2, the present configuration comprises the upstream and the downstream fuel cell apparatuses each comprising a fuel cell apparatus. A single fuel cell apparatus gives an output of about 0.5 to 1.0 MW. When building a power generating plant of a larger capacity, each of the upstream and the downstream fuel cell apparatuses may be configured as a group of a plurality of fuel cell apparatuses, where those groups of fuel cell apparatuses are connected in series in a flow direction of gas.

Further, in the embodiments 1 and 2 shown in FIGS. 1 and 2, as to the method for supplying the oxidizing gas for the two fuel cell apparatuses, an arrangement of the two oxidizing gas channels in parallel has been presented. The invention is not however limited to this, but a method for supplying oxidizing gas may be selected so as to achieve a maximum electric output of the both cell apparatuses while maintaining a thermal balance for the individual fuel cell apparatuses. For example, it is possible to supply all or part of the oxidizing gas in series.

According to the present invention, as is clear from the above, the following excellent advantages are available.

According to the fuel cell power generating system of the invention, in which a plurality of internal reforming type fuel cell apparatuses are connected in series in the flow direction of the fuel gas, it is possible to supply the fuel gas which serves as a reaction gas for the fuel cell and as a cooling gas of the fuel cell in an amount sufficient to cope with the heat removal requirement of the fuel cell apparatuses. The methanator provided between the fuel cell apparatuses methanates the fuel gas after the reforming reactions, discharged from the upstream fuel cell apparatus, and regenerates the same as a fuel gas having a cooling ability containing methane. This permits repeated effective utilization of the fuel gas for reaction as well as for cooling, without using a circulating blower of high-temperature specifications. In addition, because the fuel gas is utilized for fuel cell reaction and for cooling the fuel cells, a special piping for cooling is not necessary, thus providing a power generating system of a high efficiency having a simple piping configuration with limited radiant heat loss.

In one embodiment, a plurality of internal reforming type fuel cell apparatuses are connected in series in the flow direction of the fuel gas via the methanator, and the foregoing internal reforming type fuel cell apparatus has a structure in which the fuel cell section and the reforming reaction section are separately provided in the fuel cell apparatus. There is therefore available a high-efficiency fuel cell power generating system of a simple configuration, and it is possible to achieve an optimum design of the reforming reaction section as a cooler, thus permitting achievement of a fuel cell power generating system excellent in cooling ability of fuel cells and cell properties.

In another embodiment, the methanator separately provided on the upstream side of the fuel gas side of the fuel cell apparatus located in the most upstream in the flow direction of the fuel gas makes it possible as required to cause progress of methanation reaction of the fuel gas and to adjust the amount of cooling resulting from the reforming reaction in the fuel cell apparatus in the upstream. Particularly, the methanator alleviates the risk of carbon precipitation by pre-reforming of a high-grade hydrocarbon in the raw fuel, and reduces the risk of sulfur poisoning of the reforming catalyst of the internal reforming type fuel cell apparatus in the downstream.

In a further embodiment, the bypass piping allows part of the fuel gas as required to bypass the fuel cell in a state capable of adjusting the flow rate to permit easy adjustment of the amount of heat in reforming reaction in the fuel cell apparatus, thus making it available a fuel cell power generating system having a heat controllability under a wide range of operating conditions.

In a further embodiment, the methanator provided between a plurality of reforming reaction sections connected in series serves to permit efficient reforming reaction cooling, and ensures repeated efficient utilization of the reformed gas as a cooling gas in a plurality of fuel cell apparatuses without using a circulating blower. Since the reformed gas in the system of the invention is configured so as to have no relationship with the cell reaction until completion of the role of the reformed gas as a cooling gas, the reformed gas in the system of the invention shows no change in the composition on the level of the number of atoms, and cooling of the fuel cell apparatus using the reformed gas is easy to be achieved with a high reliability. Further, the reformed gas discharged from the reforming reaction section in the most downstream is directed into the fuel cell section, and the reformed gas for cooling can be effectively used as a fuel gas, thus making it unnecessary to introduce an excessive gas as a reformed gas for cooling, and there is available a fuel cell power generating system ensuring a high system efficiency and high-performance cooling.

In a further embodiment, arrangement of a plurality of fuel cell apparatuses into an integral structure makes it possible to operate the upstream and the downstream fuel cell apparatuses as a single fuel cell apparatus, simplifies operational control, and reduces the number of high-temperature piping systems, thus reducing the amount of radiant heat.

In a further embodiment, the methanator provided further in the upstream of the fuel gas side of the fuel cell apparatus located in the most upstream in the flow direction of the fuel gas makes it possible to cause as required the reforming reaction section of the reformed gas to proceed, and to adjust the amount of cooling by the reforming reaction in the fuel cell apparatus in the upstream. Particularly, pre-reforming of higher hydrocarbon in the raw fuel alleviates the risk of carbon precipitation, and reduces the risk of sulfur poisoning of the reforming catalyst of the reforming reaction section in the downstream.

In a further embodiment, the reaction heat generated upon methanation reactions is effectively utilized within the fuel cell power generating system by means of the heat-exchange type methanator, thus permitting improvement of the power generating efficiency.

In a further embodiment, the bypass piping makes it possible for part of the reformed gas as required to bypass the reforming reaction section or the reforming reaction section and the following methanator in a state capable of adjusting the flow rate so as to permit easy adjustment of the amount of heat of cooling caused by the reforming reaction in the reforming reaction section of the fuel cell apparatus, thus making it available a fuel cell power generating system excellent in heat controllability under a wide range of operating conditions.

In a further embodiment, it is possible to adjust the methane flow rate in the fuel gas at the exit of the methanator in a state capable of prediction by adjusting the methanation reaction temperature of the methanator, and it is consequently possible to adjust the flow rate of methane supplied to the fuel cell apparatus located in the downstream of the fuel gas, and thus to appropriately adjust the amount of heat of cooling of the fuel cell apparatus caused by the reforming reaction of methane, thus permitting efficient adjustment of the operating temperature of the fuel cell apparatus.

In a further embodiment, the methane flow rate in the reformed gas at the exit of the methanator can be predicted and adjusted by adjusting the methanation reaction temperature in the methanator, and as a result, it is possible to adjust the flow rate of methane supplied to the reforming reaction section of the fuel cell apparatus located in the downstream of the reformed gas, thus permitting appropriate adjustment of the amount of heat of cooling of the fuel cell apparatus caused by the reforming reaction of methane, thereby efficiently adjusting the operating temperature of the fuel cell apparatus.

What is claimed is:

1. A fuel cell power generating system using a fuel gas containing a hydrocarbon or an alcohol and steam and an internal reforming type fuel cell apparatus operating with a supplied oxide gas, comprising:

at least two such fuel cell apparatuses connected in series in the flow direction of the fuel gas via a methanation reactor that is set between two fuel cell apparatuses.

2. The fuel cell power generating system according to claim 1, wherein said internal reforming type fuel cell apparatus comprises:

a fuel cell section comprising a plurality of fuel cell units each having a fuel gas electrode operating with the supplied fuel gas and an oxidizing gas electrode operating with supplied oxidizing gas; and a reforming reaction section being arranged to be thermally combined with said fuel cell section, which converts the fuel gas containing a hydrocarbon into a fuel gas mainly containing hydrogen through a reforming reaction;

wherein the fuel gas supplied from outside to said fuel cell apparatus is directed, after supplied to said reforming reaction section, to the fuel gas electrode of said fuel cell section.

3. The fuel cell power generating system according to claim 1, wherein the raw fuel gas containing a hydrocarbon or an alcohol and steam is supplied to said fuel cell apparatus located in the most upstream in the flow direction of the fuel gas through a methanization reactor separately provided.

4. The fuel cell power generating system according to claim 1, wherein there is provided a piping through which part of the fuel gas bypasses said fuel cell apparatus.

5. The fuel cell power generating system according to claim 1, wherein said methanation reactor is a heat-exchanger type reactor which has therein a catalyst, and is provided with a reaction-side space where the methanation reaction proceeds in the flowing gas and a cooling-side space configured by thermally combining with said reaction-side space and allowing flow of a coolant therein; and wherein a reaction heat resulting from the methanation reaction available in said cooling-side space is utilized in said fuel cell power generating system.

6. A fuel cell power generating system comprising a plurality of fuel cell apparatuses each comprising a fuel cell section comprising a plurality of fuel cell units each having a fuel gas electrode operating with a supplied fuel gas and an oxidizing gas electrode operating with a supplied oxidizing gas; and a reforming reaction section being arranged to be thermally combined with said fuel cell section, which converts a fuel gas containing a hydrocarbon into a fuel gas mainly containing hydrogen through a reforming reaction;

wherein at least two of said fuel cell apparatuses are connected in a series in the flow direction of the reformed gas via a methanation reactor that is set between two fuel cell apparatuses, and the reformed gas discharged from the reforming reaction section located most downstream in the flow direction of the reformed gas is supplied as the fuel gas to the fuel gas electrode of said fuel cell section.

7. The fuel cell power generating system according to claim 6, wherein the raw fuel gas containing a hydrocarbon or an alcohol and steam is supplied to the reforming reaction section of the fuel cell apparatus located in the most upstream in the flow direction of the reformed gas through a methanation reactor separately provided.

8. The fuel cell power generating system according to claim 6, wherein said methanation reactor is a heat-exchanger type reactor which has therein a catalyst, and is provided with a reaction-side space where the methanation reaction proceeds in the flowing gas and a cooling-side space configured by thermally combining with said reaction-side space and allowing flow of a coolant therein; and wherein a reaction heat resulting from the methanation reaction available in said cooling-side space is utilized in said fuel cell power generating system.

9. A fuel cell power generating system comprising a fuel cell apparatus comprising a structure formed by alternately laminating a fuel cell section which is composed of flat sheet-shaped fuel cell units each having a fuel gas electrode operating with a supplied fuel gas and an oxidizing gas electrode operating with a supplied oxidizing gas, and a flat sheet-shaped reforming reaction section being arranged to be thermally combined with said fuel cell section, which converts a fuel gas containing a hydrocarbon into a fuel gas mainly containing hydrogen through a reforming reaction; and a methanation reactor that is set between two fuel cell apparatuses;

wherein said fuel cell apparatus is configured by grouping a plurality of reforming reaction sections into at least two arrangement groups so that the reformed gas having passed through the reforming reaction section of one arrangement group flows through said methanation reactor separately provided outside, and then is directed to the reforming reaction section of another arrangement group, the reformed gas discharged from the reforming reaction section of an arrangement group located most downstream in the flow direction of the reformed gas being supplied as the fuel gas to the fuel gas electrode of said fuel cell section; and wherein the reforming reaction sections arranged adjacent to each other via said fuel cell section are selected so as to belong to mutually different arrangement groups.

10. The fuel cell power generating system according to claim 9, wherein the raw fuel gas containing a hydrocarbon or an alcohol and steam is supplied to the reforming reaction section of the fuel cell apparatus located in the most upstream in the flow direction of the reformed gas through a methanation reactor separately provided.

11. The fuel cell power generating system according to claim 9, wherein said methanation reactor is a heat-exchanger type reactor which has therein a catalyst, and is provided with a reaction-side space where the methanation reaction proceeds in the flowing gas and a cooling-side space configured by thermally combining with said reaction-side space and allowing flow of a coolant therein; and wherein a reaction heat resulting from the methanation reaction available in said cooling-side space is utilized in said fuel cell power generating system.

12. The fuel cell power generating system according to claim 9, wherein there is provided a piping for part of the reformed gas to bypass said reforming reaction section or said reforming reaction section and said following methanation reactor.

13. An operating method of a fuel cell power generating system comprising at least two internal reforming type fuel cell apparatuses, operating with a fuel gas containing a hydrocarbon or an alcohol and steam and an oxidizing gas, connected in series in the flow direction of the fuel gas via a methanation reactor that is set between two fuel cell apparatuses, which comprises the step of:

adjusting the methanation reaction temperature at the exit portion of the fuel gas of said methanation reactor, thereby adjusting the operating temperature of said fuel cell apparatuses.

14. An operating method of a fuel cell power generating system comprising at least two fuel cell apparatuses each having a fuel cell section comprising a plurality of fuel cell units each having a fuel gas electrode operating with a supplied fuel gas and an oxidizing gas electrode operating with a supplied oxidizing gas, and a reforming reaction configured by thermally combining said fuel cell section and converting a reforming gas containing a hydrocarbon into a reformed gas mainly containing hydrogen via a reforming reaction, connected in series in the flow direction of the reformed gas via methanation reactors that are set between two fuel cell apparatuses, which comprises the step of:

adjusting the methanation reaction temperature at the exit portion of the fuel gas of said methanation reactor, thereby adjusting the operating temperature of said fuel cell apparatuses.

\* \* \* \* \*